Aug. 14, 1945.   I. A. ROHRIG ET AL   2,382,666
MANUFACTURE OF DIAMOND TOOLS
Filed Dec. 13, 1943   3 Sheets-Sheet 1

INVENTORS
IGNATIUS A. ROHRIG
BY NORMAN A. KERSTEIN
ATTORNEYS

Aug. 14, 1945.  I. A. ROHRIG ET AL  2,382,666

MANUFACTURE OF DIAMOND TOOLS

Filed Dec. 13, 1943   3 Sheets-Sheet 2

INVENTORS
IGNATIUS A. ROHRIG
NORMAN A. KERSTEIN
BY
ATTORNEYS

Aug. 14, 1945.   I. A. ROHRIG ET AL   2,382,666
MANUFACTURE OF DIAMOND TOOLS
Filed Dec. 13, 1943   3 Sheets-Sheet 3
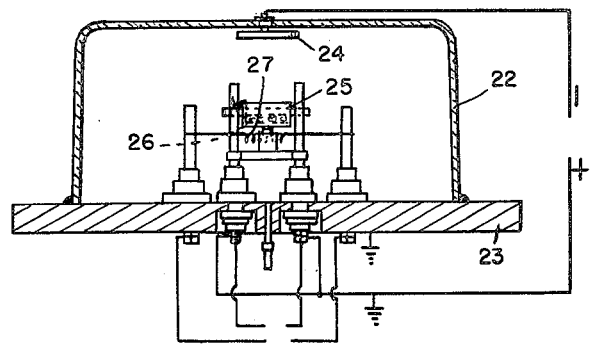
FIG. 8.
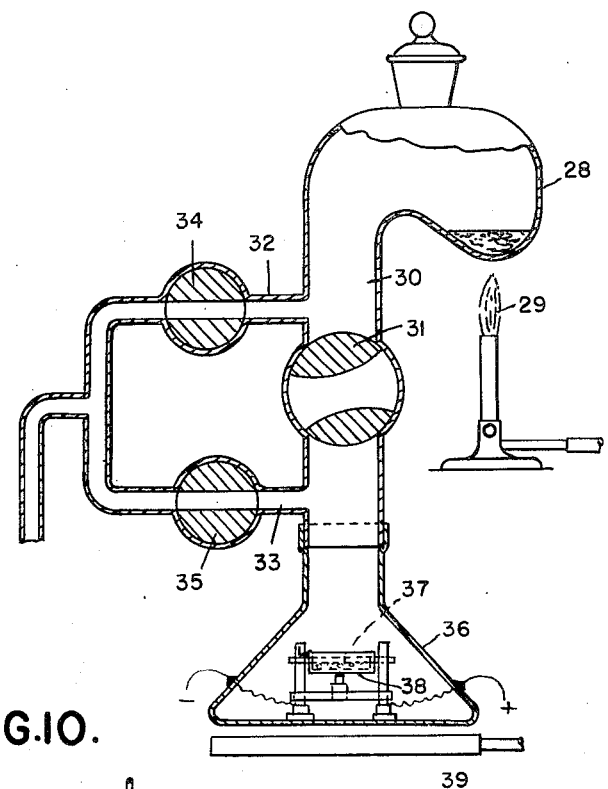
FIG. 9.
FIG. 10.
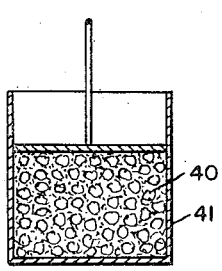
INVENTORS
IGNATIUS A. ROHRIG
BY NORMAN A. KERSTEIN
ATTORNEYS Patented Aug. 14, 1945

2,382,666

UNITED STATES PATENT OFFICE 2,382,666

MANUFACTURE OF DIAMOND TOOLS

Ignatius A. Rohrig and Norman A. Kerstein, Detroit, Mich.

Application December 13, 1943, Serial No. 514,176

11 Claims. (Cl. 51—309).

The invention relates to the manufacture of diamond tools which have bodies comprising matrix material and industrial diamonds secured to the matrix material.

The invention has for one of its objects to provide an improved method of making a diamond tool by means of which the diamonds are effectively anchored in the matrix material.

The invention has for another object to provide an improved method of making a diamond tool by means of which each diamond is bonded directly to a metal layer deposited on the diamond and the metal layer is directly bonded to the matrix material.

The invention has for a further object to provide an improved diamond tool in which each diamond is effectively bonded to the matrix material by means of an intermediate layer having an affinity for the matrix material.

With these as well as other objects in view, the invention resides in the novel features as more fully hereinafter set forth.

In the drawings:

Figure 8 is a view similar to Figure 3 illustrating another apparatus for carrying out the second step;

Figure 9 is a diagrammatic view illustrating another apparatus also for carrying out the second step;

Figure 10 is a diagrammatic view illustrating apparatus for carrying out the third step of the method.

Figure 2:
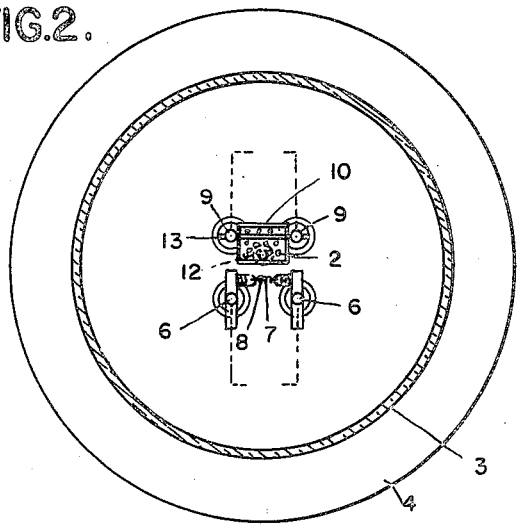
Figure 2 is a plan view of apparatus used in carrying out the second step in the method.
Figure 5:
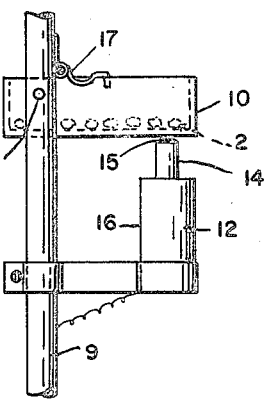
Figures 4 and 5 are enlarged views of portions of Figures 2 and 3, respectively.
Figure 3:
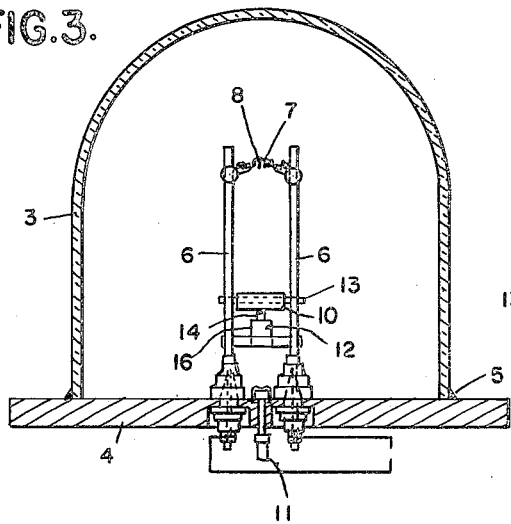
Figure 3 is a cross section on the line 3—3 of Figure 2.
Figure 4:
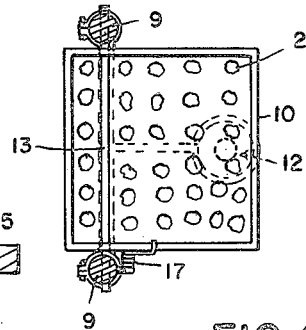
Figure 1:
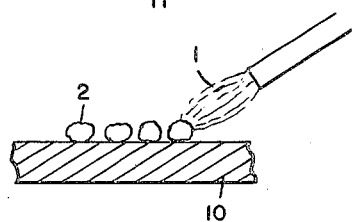
Figure 1 is a diagrammatic view illustrating the first step in the method embodying the invention.

In carrying out the method of making a diamond tool, the industrial diamonds are first cleaned and dried to remove all foreign elements, including occluded gas and moisture layers from their surfaces by one of a number of different processes. As illustrated in Figure 1, the cleaning and drying step is accomplished by passing a hot blowpipe flame 1 rich in ions over the surfaces of the diamonds 2.

The next step comprises coating the diamonds 2 with metal in the form of very small particles under sub-atmospheric pressure. As illustrated in Figures 2, 3, 4 and 5, the step is carried out by an evaporation process in which 3 is a glass bell jar and 4 is a steel plate base supporting the jar, suitable means, such as wax 5, sealing the joint between the jar and base. 6 are metal conductors extending through and electrically insulated from the base and carrying at their upper ends the filament 7 which holds the metal piece 8 to be evaporated. The metal piece 8 may, for example, be iron, nickel, beryllium, silicon, boron, cobalt, columbium, chromium, or an alloy, such as ferro-columbium, ferro-silicon, ferro-chromium, or ferro-vanadium, all having an affinity for the matrix material to be used in making the diamond tool. 9 are other metal conductors extending through and electrically insulated from the base 4 and carrying the support 10 for the individual diamonds 2, the support being formed of suitable material, such as glass, quartz, or metal electrically insulated from the apparatus, and being located below the filament 7. The chamber formed by the jar and base is connected by the tubing 11 to suitable apparatus for producing sub-atmospheric pressure in the chamber, the pressure being preferably between 1 and $10^{-3}$ mm. of mercury. The metal conductors 6 are adapted to be connected to a source of low voltage electric current. The construction is such that upon passing the current through the metal conductors 6 and the filament 7 the metal piece 8 is heated and evaporates or sublimes to produce molecular rays which pass out in all directions, certain of the molecules impinging and being deposited on the surfaces of the diamonds. As a result, the metal forming the layers on the diamonds is bonded to the diamonds.

For the purpose of completely coating the diamonds, they are agitated to expose all of their surfaces to the metal being deposited thereon. This is accomplished in the present instance by delivering a series of impacts to the support 10 for the diamonds by means of the solenoid 12. The support is a box open at its upper end and extending between and pivotally connected to the metal conductors 9 by the electrically non-conducting pivot pin 13 which extends through the side walls of the box and the metal conductors. The arrangement is such that the major portion of the box is between the metal conductors 6 and 9. The solenoid is below the box and has the vertically reciprocable core 14 provided with the rubber tip 15 for engaging the bottom of the box at a distance from the pivot pin. The solenoid also has the coil 16 which is supported on and electrically connected to the metal conductors 9, suitable provision being made for electrically connecting these conductors through a suitable circuit making and breaking device to a source of electric energy. The spring 17 is preferably provided having one end secured to a metal conductor 9 and the other end engaging the upper edge of one of the side walls of the box to resiliently urge the box toward the solenoid.

Figure 6:
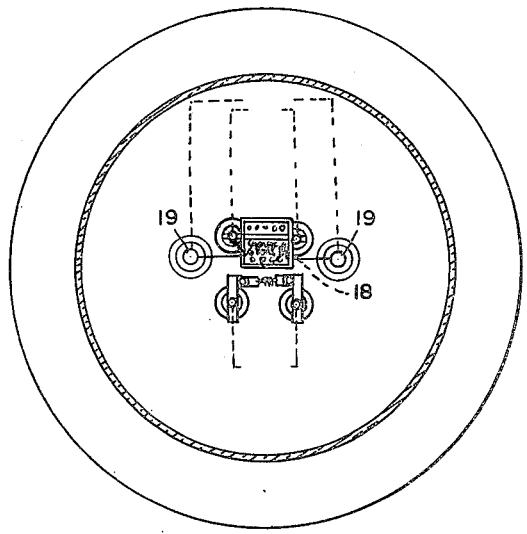
Figures 6 and 7 are views similar to Figure 2 illustrating modifications.

A modified step is illustrated in Figure 6 which differs from that illustrated in Figures 2, 3, 4 and 5 in heating the diamonds by the coil 18, the terminals of which are connected to the metal conductors 19.

Figure 7:
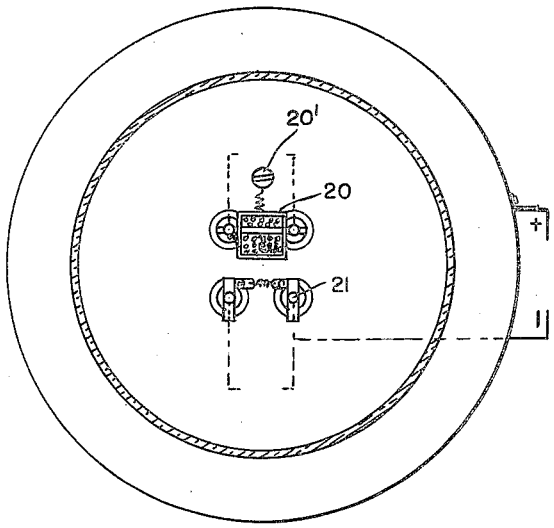

Figure 7 illustrates another modified step in the evaporation process in which the flow of the evaporated metal is directed, the metal vapor activated, and the surfaces of the diamonds are also activated by glow discharge. The apparatus for accomplishing this result is generally the same as that illustrated in Figures 2, 3, 4 and 5, except that the support 20 on which the diamonds rest is a thin metal box and this support is electrically connected to the metal conductor 20'. The metal conductor 20' and the metal conductors 21 are connected respectively to the plus and minus sides of a source of high voltage, low amperage electric current which may be either alternating or direct.

The step of cleaning and drying the diamonds may also be carried out by exposing the diamonds to a glow discharge in the apparatus of Figure 7 while the evaporation chamber is being evacuated and the diamonds are being agitated and prior to evaporating or subliming the metal piece.

Instead of coating the diamonds with metal in molecular form under sub-atmospheric pressure by an evaporation process, as illustrated in Figures 2 to 7, inclusive, the diamonds may be coated with metal in molecular form under sub-atmospheric pressure by a cathodic sputtering process, illustrated in Figure 8, in which 22 is a glass bell jar and 23 is a steel plate base on which the jar is mounted, the joint therebetween being sealed by suitable means, such as wax. 24 is the cathode mounted centrally within and at the top of the jar and 25 the anode below the cathode and carrying the diamonds 26. If desired, the heater coil 27 may be used for heating the diamonds. The cathode is made of or coated with the metal to be sputtered, which may be the same as used in the evaporation process, and the residual gas in the chamber formed by the jar and base may be air, hydrogen, argon, or some other gas, the vacuum in the chamber ranging approximately from 1 to $10^{-2}$ mm. of mercury. The cathode and anode are connected to a suitable source of electric energy which may be either D. C. or A. C. and which may have a potential ranging from 1000 volts to 20,000 volts. In operation glow discharge takes place and metal is transferred from the cathode to the anode in molecular form so that the diamonds which are placed just beyond the cathode dark space have deposited thereon layers of sputtered metal from the cathode. The construction of the anode and solenoid for delivering a series of impacts to the anode to agitate the diamonds is the same and operates in the same manner as the construction of the support 10 and solenoid 12 of Figures 2, 3, 4 and 5.

The metal may also be deposited on the diamonds in molecular form by a metal carbonyl vapor process, as illustrated in Figure 9, in which the metal carbonyl is located in a depression in the lateral chamber 28 positioned so that the chamber and the metal carbonyl therein may be heated by suitable means, such as the flame 29. The lateral chamber is connected to the upper end of the upright chamber 30 which is provided intermediate its upper and lower ends with the valve 31 and which connects above and below the valve with the lateral passages 32 and 33, respectively, leading to suitable vacuum apparatus. These passages are controlled by valves 34 and 35, respectively. The lower end of the upright chamber 30 opens into the base chamber 36 in which are located the diamonds 37 carried upon the support 38. The base chamber is adapted to be heated by suitable means, such as the electric heater 39, to raise the temperature in the base chamber which varies according to the metal carbonyl used and the conditions of the pressure used in the system.

In operation, when the system is in the final stage of evacuation and the metal carbonyl is intensely heated, the valves 34 and 35 are closed and the valve 31 is open allowing the metal carbonyl vapor to rush into the heated base chamber 36 where it immediately decomposes and the metal condenses on the exposed surfaces of the diamonds 37. The diamonds are preferably agitated in the same manner as shown in Figures 2, 3, 4 and 5 so that the deposited metal completely coats or envelopes the diamonds. Metal carbonyl having iron, nickel, molybdenum, and other metals as an element may be used.

After the diamonds have been coated with metal, according to the above steps, in each of which the coating metal is bonded to the diamonds, the coated diamonds are placed in the matrix material which forms with the diamonds the body of the tool and then the coating metal is bonded to the matrix material. The matrix material is powdered metal, such as tungsten-carbide and cobalt, for which the coating metal has an affinity, as previously described. As illustrated in Figure 10, the metal coated diamonds and the matrix material 40 in the form of powdered metal are intimately mixed and placed in the mold 41 and the mass is heated to the required temperature and also subjected to the required pressure to accomplish the sintering of the powdered metal and produce a body having a shape predetermined by the mold. During the sintering the matrix material is fused and thereby chemically bonded to the coating metal upon the diamonds and, furthermore, in certain instances at least, fusion occurs between the diamonds and their coating metal to secure a chemical bond in addition to the molecular bond.

With the above method, it will be seen that the diamonds are bonded to the metal layers deposited thereon in molecular form and that these metal layers are bonded to the matrix material forming the body of the tool with the result that the diamonds are effectively secured to the bodies and cannot be lost without destroying the molecular and chemical bond relationship.

What we claim as our invention is:

1. The method of making a diamond tool having a body comprising matrix material and diamonds anchored to the matrix material which comprises cleaning the surfaces of the diamonds, depositing on the cleaned diamonds layers of metal in the form of very small particles under sub-atmospheric pressure, then placing the diamonds in matrix material, and bonding their metal layers to the matrix material.

2. The method of making a diamond tool having a body comprising matrix material and diamonds anchored to the matrix material which comprises cleaning the surfaces of the diamonds, depositing on the cleaned diamonds layers of metal in molecular form under sub-atmospheric pressure, then placing the diamonds in matrix material, and bonding their metal layers to the matrix material.

3. The method of making a diamond tool having a body comprising metal matrix material and diamonds anchored to the metal matrix material which comprises passing electric current through a metal carrying filament under sub-atmospheric pressure to deposit molecules of the metal on the diamonds, then placing the diamonds in metal matrix material, and bonding the metal deposited on the diamonds to the metal matrix material.

4. The method of making a diamond tool having a body comprising metal matrix material and diamonds anchored to the metal matrix material which comprises connecting a cathode and an anode to a source of electric energy with the cathode carrying metal and with both the cathode and anode under sub-atmospheric pressure to transfer metal in molecular form from the cathode to the diamonds, then positioning the diamonds in metal matrix material, and bonding the metal deposited on the diamonds to the metal matrix material.

5. The method of making a diamond tool having a body comprising metal matrix material and diamonds anchored to the metal matrix material which comprises heating metal carbonyl to vaporize the same, subjecting the diamonds under sub-atmospheric pressure to the vapor to deposit metal on the diamonds, then placing the diamonds in metal matrix material, and bonding the metal depoisted on the diamonds to the metal matrix material.

6. The method of making a diamond tool which comprises coating the diamonds with metal in molecular form under sub-atmospheric pressure and thereby bonding the coating metal to the diamonds, placing the coated diamonds in matrix material, and bonding the coating metal to the matrix material.

7. The method of making a diamond tool which comprises agitating the diamonds and during their agitation completely coating the diamonds with metal in molecular form under sub-atmospheric pressure, placing the diamonds in matrix material, and bonding the coating metal to the matrix material.

8. The method of making a diamond tool having a body comprising metal matrix material and diamonds anchored to the metal matrix material which comprises bonding metal to the diamonds by depositing on the diamonds metal in molecular form under sub-atmospheric pressure, and then bonding the metal on the diamonds to metal matrix material having an affinity for the metal on the diamonds and forming the body by subjecting the diamonds and metal matrix material to heat and pressure.

9. The method of making a diamond tool having a body comprising metal matrix material and diamonds anchored to the metal matrix material, which comprises agitating the diamonds and during their agitation passing electric current through a metal carrying filament under sub-atmospheric pressure to deposit molecules of the metal on the diamonds to completely coat the diamonds, and then bonding the metal deposited on the diamonds to the metal matrix material.

10. The method of making a diamond tool having a body comprising metal matrix material and diamonds anchored to the metal matrix material, which comprises agitating the diamonds and during their agitation connecting a cathode and an anode to a source of electric energy with the cathode carrying metal and with both the cathode and anode under sub-atmospheric pressure to transfer metal in molecular form from the cathode to the diamonds to completely coat the diamonds, and then bonding the metal deposited on the diamonds to the metal matrix material.

11. The method of making a diamond tool having a body comprising metal matrix material and diamonds anchored to the metal matrix material, which comprises agitating the diamonds and during their agitation heating metal carbonyl to vaporize the same, subjecting the diamonds under sub-atmospheric pressure to the vapor to deposit metal on the diamonds to completely coat the diamonds, and then bonding the metal deposited on the diamonds to the metal matrix material.

IGNATIUS A. ROHRIG.
NORMAN A. KERSTEIN.

DISCLAIMER 2,382,666.—*Ignatius A. Rohrig* and *Norman A. Kerstein*, Detroit, Mich. MANUFACTURE OF DIAMOND TOOLS. Patent dated Aug. 14, 1945. Disclaimer filed Jan. 31, 1947, by the inventors.

Hereby enter this disclaimer to claims 1, 2, 4, 6, and 8.

[*Official Gazette March 4, 1947.*]